United States Patent

[11] 3,609,526

| [72] | Inventor | Aleksander Z. Chaberski<br>717 Ellicott St., Buffalo, N.Y. 14203 |
|---|---|---|
| [21] | Appl. No. | 836,113 |
| [22] | Filed | June 24, 1969 |
| [45] | Patented | Sept. 28, 1971 |

[54] CONTACTLESS METHOD AND APPARATUS FOR DETERMINING ELECTRICAL RESISTIVITY
14 Claims, 5 Drawing Figs.

[52] U.S. Cl. .................................................. 324/34, 324/13
[51] Int. Cl. ....................................................... G01r 33/12
[50] Field of Search ........................................... 324/13, 14, 34, 40, 62

[56] References Cited
UNITED STATES PATENTS

| 1,459,970 | 6/1923 | Burrows ...................... | 324/14 |
| 1,599,645 | 9/1926 | Burrows ...................... | 324/14 |
| 2,537,753 | 1/1951 | Hansen ........................ | 324/14 |
| 3,492,566 | 1/1970 | Gross .......................... | 324/34 |

FOREIGN PATENTS

| 164,977 | 6/1921 | Great Britain ................ | 324/14 |

OTHER REFERENCES

Miller D. S.; A Recording Torque Magnetometer; The Review of Scien. Inst.; Vol. 21, No. 7; July 1950, pp 605– 607 (Copy in 324/34 Suscep.)

Primary Examiner—Rudolph V. Rolineo
Assistant Examiner—R. J. Corcoran
Attorney—Allen J. Jaffe ABSTRACT: A method and apparatus for determining the electrical resistivity of a sample, which comprises; suspending the sample in a rotating magnetic field in such an orientation that the flux penetration of the sample by the field is a maximum, determining the torque imparted to the sample by the field and determining the volumetric moment of inertia of the sample whereby the resistivity of the sample can be calculated.

INVENTOR
ALEKSANDER Z. CHABERSKI
BY
ATTORNEY

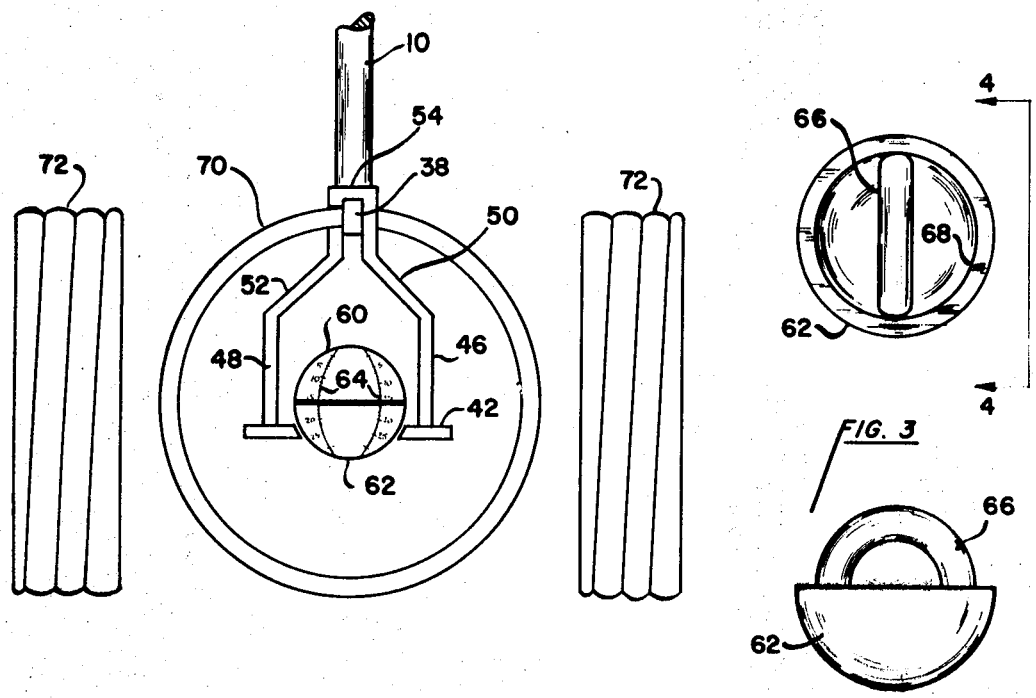
FIG. 2
FIG. 3
FIG. 4
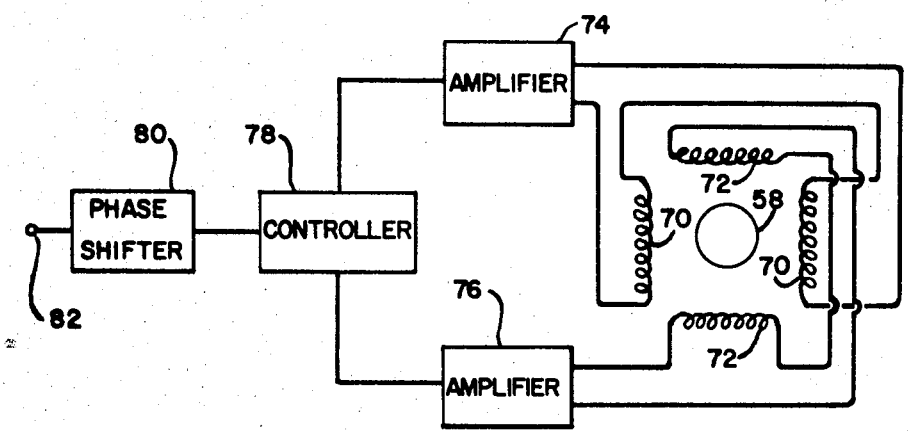
FIG. 5
INVENTOR
ALEKSANDER Z. CHABERSKI
BY Allen D. Duffe
ATTORNEY 3,609,526

CONTACTLESS METHOD AND APPARATUS FOR DETERMINING ELECTRICAL RESISTIVITY

BACKGROUND OF THE DISCLOSURE

The present invention relates to a method and apparatus for measuring electrical resistivity or conductivity and, more particularly, to a contactless method and apparatus for determining the same.

Instruments are currently known for measuring electrical resistivity, the operating parts of which make some physical electrical contact with the material whose resistivity is to be determined. In addition to the possibility of damaging such materials by the physical contact, there is also a chance that impurities are introduced which are contained on the instrument contacting surfaces. These disadvantages become extremely significant when very small and fragile semiconductor materials are tested. Moreover, with contact-type apparatus the quantity measured is the contact resistivity and not the true resistivity of the sample.

Various contactless methods and apparatus have been proposed to measure resistivity, among which are those which utilize the interaction between a rotating magnetic field and an induced electric current in the sample. A relationship is established between the magnetic field and the torque it produces in terms of the sample parameters and the quantities related to the rotating magnetic field. The solution of such relationships whereby resistivity can be determined is a very difficult task, since it involves a solution of Maxwell's equations applied to the sample. This includes the boundary conditions of the sample; therefore, a different solution will be obtained for each different sample shape. Moreover, such solutions are almost always in the form of an infinite sequence, and as such, are not suited for practical application.

BRIEF SUMMARY OF THE INVENTION

The foregoing, as well as other, difficulties of prior methods are overcome according to the present invention which enables the electrical resistivity of a sample to be determined without any detrimental physical contact with the sample, and as such is nondestructive.

The present invention provides a contactless, nondestructive resistivity measuring method and apparatus which utilizes the interaction between a relatively rotating magnetic field and an induced electric current in the sample. The method and the apparatus for carrying it out is of general applicability to various arbitrarily shaped samples and is, therefore, independent of boundary conditions.

According to the principles of the present invention, it has been determined that the torque imparted to the sample due to a relatively rotating magnetic field, and the volumetric moment of inertia of the sample about a particular predetermined axis thereof can be related to the resistivity of the sample. It therefore becomes a simple matter to determine the resistivity by measuring the torque or deflection of the sample in response to an applied magnetic field and also measuring the volumetric moment of inertia of the sample about a particular predetermined axis. This predetermined or preferred axis is the one which permits the maximum flux penetration from the magnetic field through the sample. Thus, if the sample is suspended from an axis that is perpendicular to the relatively rotating magnetic field, the sample must be orientated with respect to such axis that the flux penetration of the sample is a maximum. It is The volumetric moment of inertia in this orientation that is determined.

The method and apparatus according to the present invention is useful in determining the resistivity of materials which are coated with an insulating layer that might have been caused by oxidation or otherwise. The effects of enhanced conductivity in semiconductors due to the injection of energetic electric carriers from conductive metallic electrodes or contacts is also avoided by the apparatus and method of the present invention. The method and apparatus taught herein also finds application in the study of electric isotropy.

Basically, then, the present invention provides a method and apparatus for determining the electrical resistivity of a sample which comprises; placing the sample in a relatively rotating magnetic field in such an orientation that the flux penetration off the sample is a maximum, and in this orientation measuring the volumetric moment of inertia of the sample, and measuring the resulting angular deflection of the sample in response to the applied magnetic field.

BRIEF DESCRIPTION OF THE DRAWINGS

For a fuller understanding of the present invention, reference should now be had to the following detailed description of the same taken in conjunction with the accompanying drawing wherein:

FIG. 2 is a view taken along line 2—2 of FIG. 1;

FIG. 3 is a sectional view taken along line 3—3 of FIG. 1, illustrating the interior of the sample holder;

FIG. 4 is a view taken along line 4—4 of FIG. 3; and

FIG. 5 is a schematic circuit diagram in block form of typical excitation structure for producing the rotating magnetic field.

DESCRIPTION OF THE PREFERRED EMBODIMENT

Figure 1:
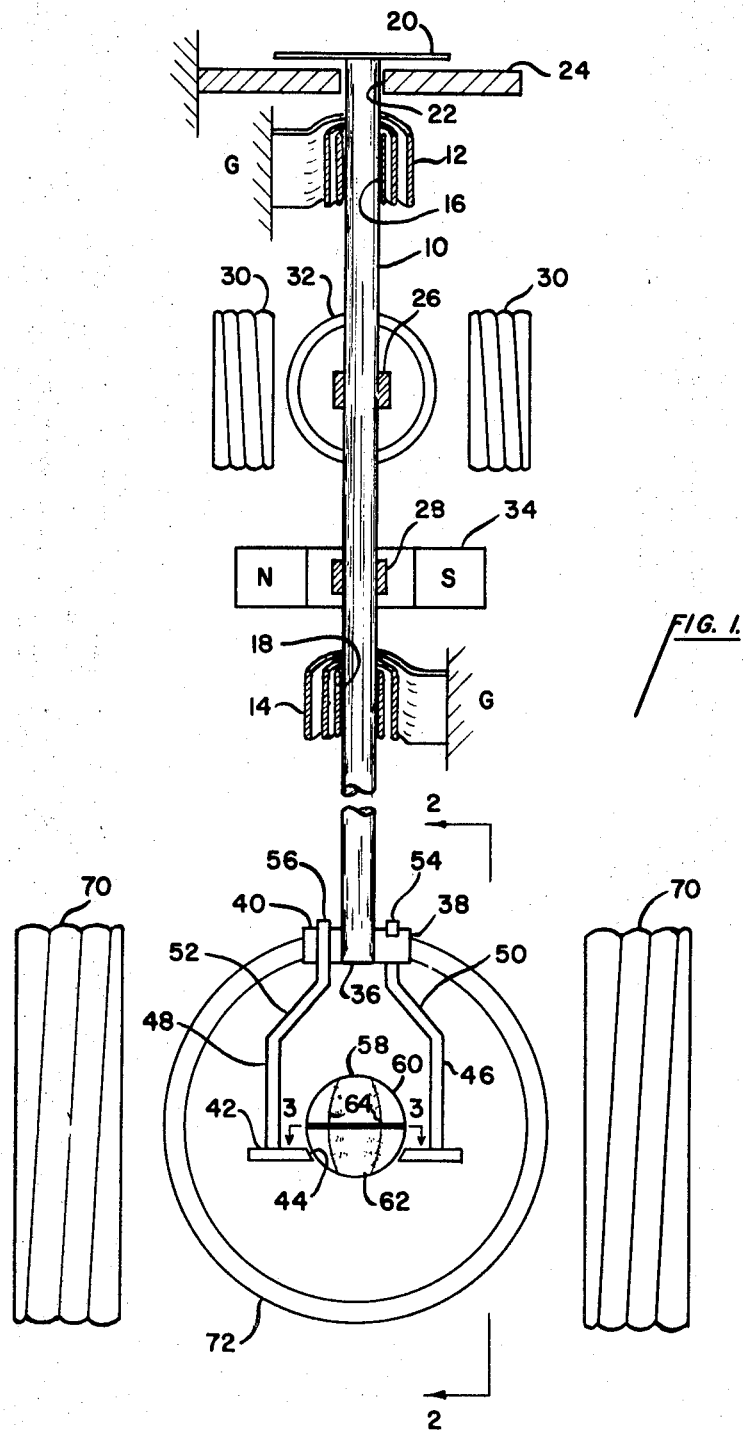
FIG. 1 is an elevational, schematic view of the apparatus of the present invention with parts thereof shown in section.

Referring now to the drawings and, more particularly to FIG. 1 an elongated cylindrical rod 10 of a suitable dielectric material such as sapphire is resiliently attached to a fixed, stationary support, schematically depicted at G, which might comprise a housing or the like. To provide for such resilient attachment, a pair of spirally coiled springs 12 and 14 of rectangular cross section are fixed at one end 16 and 18, respectively, to rod 10 and at the other end to the fixed support. As illustrated, the springs 12 and 14 act in opposite directions whereby clockwise rotation or rod 10 about its longitudinal axis is resisted by spring 12 and counterclockwise rotation is resisted by spring 14. Thus, a restoring torque is provided to rod 10 regardless of the direction of rotation thereof. Although springs 12 and 14 permit rotation of rod 10, they are sufficiently strong to prevent reciprocation or axial movement thereof.

As viewed in FIG. 1, the upper end of rod 10 has suitably affixed thereto a pointer 20. The rod passes with substantial clearance through an opening 22 in a fixed indicator plate 24. Pointer 20 cooperates with suitable indicia (not illustrated) on plate 24 to indicate the angular position or deflection of rod 10.

Intermediate springs 12 and 14 are first and second spaced rings or sleeves 26 and 28 which may be tightly fitted about rod 10. Rings 26 and 28 may be fabricated of any suitable conducting material such as copper. To induce a torque in ring 26 for producing rotational movement of shaft 10, suitable structure for producing a rotating magnetic field is provided adjacent ring 26 and in surrounding relation thereto. such structure may take the form of a pair of opposed magnetic coils, depicted schematically at 30 and 32. Coils 30 and 32 are adapted to be excited by a varying frequency voltage source (not illustrated). A permanent magnet depicted schematically at 34 is provided in surrounding relation to ring 28, for a purpose to become apparent hereinbelow.

As illustrated in FIGS. 1 and 2, the lower end 36 of rod 10 has a pair of radially projecting dielectric wings or ledges 38 and 40 of generally rectangular cross section, which may be integral therewith or suitably affixed thereto. These wings or ledges function to removably support a generally circular dielectric platform 42 having a central opening 44 therethrough. A pair of arms 46 and 48 are suitably attached to the platform 42 at an outer surface thereof. Arms 46 and 48 extend upwardly having inclined central sections 50 and 52 which terminate in hooked ends 54 and 56, respectively. As illustrated ends 54 and 56 are adapted to rest freely on ledges 38 and 40 for the support of platform 42. For better balance of the platform the hooked ends preferably extend in opposite directions.

A sample holder in the form of a spherical shell 58 is adapted to rest in opening 44 of platform 42. The shell has an upper half 60 and a complimentary, mating lower half 62. Each half of shell 58 has a plurality of arcuately extending indicia 64 on the surface thereof. The indicia may be spaced 120° apart, as illustrated, for cooperation with suitable markers (not illustrated) on platform 42 adjacent the edge defined by opening 42 so that the shell can be accurately placed in a predetermined position with respect to the platform. The shell may be fabricated of a suitable dielectric material, such as plastic.

As illustrated in FIG. 3 and FIG. 4, a sample 66 the resistivity of which is to be determined is adapted to be supported by the interior 68 of the shell. By way of example only, the shell is shown as supporting a sample in the form of a toroid. If it becomes necessary to provide a better support for the sample, to insure that it remain stationary, a plastic foam material might be utilized to pack the sample into the shell.

Two pair of opposed magnetic coils, schematically depicted at 70 and 72, are provided adjacent sample holder 58 such that the holder is centered within the rotating magnetic field produced by the coils. As illustrated, by way of example in FIG. 5, the rotating magnetic field may be produced by establishing two alternating current fields which are ninety degrees out of phase. To this end a signal from a standard 60-cycle source of power may be split by a phase shifter into two signals ninety degrees out of phase, each being directed to separate opposed sets of coils 70 and 72, such that the AC signal passing through coils 70 is 90° out of phase with the AC signal passing through coils 72. Suitable amplifiers 74 and 76 with a controller 78 may be provided to vary the magnitude of the signals in each set of coils. The phase shifter and standard current source are depicted schematically at 80 and 82, respectively. Any other conventional method of producing a rotating magnetic field may be employed. A circuit similar to the one illustrated in FIG. 5 may be employed for producing the varying frequency magnetic field from coils 30 and 32, previously described. A suitable oscillator would be included for changing the field frequency. To insure that the sample holder and the sample therein are centered in the magnetic field, the coils are preferably adjustable axially. Any conventional form of adjustment can be used.

Before discussing the operation of the apparatus and the method according to the present invention, it will be instructive to discuss the principles upon which such operation is based.

Applicant has developed a relationship whereby the resistivity of almost any arbitrarily shaped sample can be determined. This relationship is given as follows:

(1)  $\rho = \omega \beta^2 I_v / 4T$ wherein;

$\rho$ is the resistivity of the sample in ohm-meters, $T$ is the torque applied to the sample by the rotating magnetic field in newton-meters, $\omega$ is the angular velocity of the magnetic field in radians per second, $\beta$ is the strength of the magnetic field in webers, and $I_v$ is the volumetric moment of inertia of the sample in the preferred orientation, in meters$^5$.

since, (2)  $T = k\theta$ wherein;

$k$ is the spring constant in newton-meters per radian, and $\theta$ is the angular deflection of the sample at equilibrium in radians, then equation (1) can be expressed as:

(3)  $\rho = \omega \beta^2 I_v / 4k\theta$

Since $k$, $\omega$ and $\beta$ are constants of the system, it is only necessary to determine $\theta$ and $I_v$ in order to calculate the resistivity of the sample. The manner in which the method and apparatus according to the present invention functions to obtain these quantities will now be discussed.

As stated heretofore, the volumetric moment of inertia, $I_v$, equation (3) must be that which exists when the sample is so oriented with respect to the rotating magnetic field that the flux penetration of the sample by the field is a maximum. It is therefore necessary to determine this preferred orientation. There are various ways of determining this orientation. In order for the flux penetration to be a maximum, the flux lines of force must "see" a maximum area of the sample during one revolution thereof in the magnetic field. For certain simple-shaped objects, such as a toroid or disc, for example, the orientation which produces such a maximum area can be determined by inspection. Thus, in the case of a toroid the maximum area is exposed when the axis through the central opening thereof is contained in the plane of the magnetic lines of force. This orientation is illustrated in FIGS. 3 and 4.

When the preferred orientation is not apparent, one way of determining the same is by the use of shadow projection techniques. wherein the object is rotated in various orientations while under illumination to cast a shadow on a sensing surface, such as a screen. The orientation that produces the maximum projected area during one revolution of the sample is the preferred orientation.

Still another method of determining the preferred orientation is based on the fact that this orientation is equivalent to that in which the sample, after being excited by the rotating magnetic field, comes to equilibrium therewith in the shortest time. Thus, the times taken to reach equilibrium can be noted for various orientations and that orientation corresponding to the shortest time would be the preferred orientation.

Perhaps the easiest way of determining the proper preferred orientation for any shaped sample is based on the realization that when the flux penetration of the sample is the greatest, the induced torque and deflection of the sample will be the greatest. It therefore becomes a simple matter to place the sample into the holder 58 and place the holder on platform 42 in various orientations, noting the deflection of pointer 20 in response to the same field applied in each orientation. The orientation at the maximum noted deflection would correspond to the preferred orientation. This orientation can be recorded and set by noting the values of each indicia on arcs 64 with respect to the edge of opening 44 in the platform.

Once the preferred orientation of the sample is determined, by any of the above techniques or by other techniques that will occur to those skilled in the art, it is next necessary to determine the volumetric moment of inertia of the sample, $I_v$. With the sample in the holder 58 and the holder in the preferred orientation, as previously determined, the rod 10 is caused to oscillate as by the application of a magnetic field from coils 30 and 32 applied to the conducting sleeve 26. The excitation frequency of the field is gradually increased until the deflection of pointer 20 reaches a maximum. This frequency is noted, which is, of course, the resonant frequency of the system. The combined movement of inertia of the system can then be determined by the following relation:

(4)  $I_m = k/4\pi^2 f^2$ where, $I_m$ is the mass moment of inertia of the system in kilogram-meter$^2$ $k$ is the spring constant of the system in newton-meters per radian, and $f$ is the resonant frequency in cycles per second.

Since $k$ and $f$ are known, $I_m$ can be determined. The sample is then removed from holder 58 and the resonant frequency of the system minus the sample is then determined as above, whereby the mass moment of inertia of the system minus that of the sample, $I_{(mls)}$, can be calculated. The mass moment of inertia of the sample, $I_s$, would then be the difference between $I_m$ and $I_{(mls)}$, or (5)  $I_s = I_m - I_{(mls)}$ To obtain the volumetric moment of inertia, $I_v$, the mass moment of inertia of the sample would be divided by its density.

Instead of using forced oscillations to determine the resonant frequency as outlined above, it is possible to employ a free oscillation technique whereby the natural frequency would by used in equation (4). If free oscillations are used, magnet 34 would have to be removed to eliminate damping.

Knowing the preferred orientation and the volumetric moment of inertia with the sample in this orientation, the only item left to be determined is the torque or, more specifically, the deflection at equilibrium produced by the rotating magnetic field. The field coils 70 and 72 are energized, causing the sample, the sample holder and the rod 10 to rotate or deflect against the force of one of springs 12, and 14, depending upon the direction of the field. When the restoring torque of the spring balances the torque applied by the magnetic field, equilibrium has been reached, and the deflection of pointer 20 is noted, which is $\theta$ of equation (3). The damping magnet 34 cooperating with sleeve 28 functions to prevent too rapid a deflection. With all the unknowns thus determined. the resistivity of the sample can be calculated by applying equation (3).

When the sample, in the preferred orientation, has no sharp bends or corners as in the case of a sphere, toroid or thin disc, the method and apparatus of the present invention will determine resistivities with no error. When the shape of the sample contained sharp bends or corners, errors due to such bends have been introduced. This is because the bends cause a redistribution of electric current in the sample. Nevertheless, correction factors can be easily developed to eliminate the errors introduced by the bends in the sample. Since resistivity is a constant of the material, two shapes cut from the same material will have the same resistivity. If one shape has no bends and the other shape does, then the ratio of their resistivities calculated according to the above-described procedure will be indicative of the error introduced by the bends. Thus, a suitable correction factor can be applied.

Although a preferred manner and means of carrying out the principles of the present invention has been described, changes will occur to those skilled in the art without departing from the spirit thereof.

I claim:
1. A contactless, nondestructive method of enabling the electrical resistivity of a sample to be determined, comprising the steps of:
   1. supporting the sample in a rotating magnetic field in such a position with respect to the field that the flux penetration of the sample by the field is a maximum,
   2. determining the torque imparted to the sample in said position by the magnetic field, and
   3. determining the volumetric moment of inertia of said sample in said position about an axis thereof that is perpendicular to said magnetic field.
2. The method according to claim 1, wherein the resistivity of the sample is determined by the following relationship:
$$\rho = \omega \beta^2 I_v / 4T$$
where,
$\rho$ is the resistivity of the sample,
$\omega$ is the angular velocity of the magnetic field,
$\beta$ is the strength of the magnetic field,
$I_v$ is the volumetric moment of inertia of the sample, and
$T$ is the torque imparted to the sample by the magnetic field.
3. A nondestructive method of enabling the electrical resistivity of a sample to be determined, comprising the steps of:
1. establishing a rotating magnetic field,
   2. suspending said sample within said magnetic field in such a position with respect to said field that the flux penetration of the sample by the field is a maximum,
   3. sensing the torque imparted to said sample in said position by said magnetic field, and
   4. determining the volumetric moment of inertia of said sample in said position.
4. The method according to claim 3, wherein the step of sensing the torque comprises:
   5. measuring the deflection of said sample in response to said magnetic field.

5. The method according to claim 3, wherein the step of determining the volumetric moment of inertia of said sample, comprises:
   5. placing said sample in a holder which is supported by an elongated rod and applying a second varying frequency magnetic field to said rod to rotate the sample and said holder, and noting the frequency which produces the maximum angular deflection of said holder and sample, and
   6. removing said sample from the holder and again applying said varying frequency magnetic field to said rod and noting the frequency which produces the maximum angular deflection of said holder.
6. The method according to claim 3, wherein said axis of the sample is determined by the steps of:
   5. suspending said sample for rotation about various axes thereof,
   6. applying said magnetic field to said sample while suspended in each one of said axes, and
   7. noting the axis about which the angular deflection of said sample, in response to said magnetic field, is a maximum.
7. The method according to claim 3, wherein the resistivity of the sample is determined by the following relationship:
$$\rho = \omega \beta^2 I_v / 4T$$
where,
$\rho$ is the resistivity of the sample,
$\omega$ is the angular velocity of the magnetic field,
$\beta$ is the strength of the magnetic field,
$I_v$ is the volumetric moment of inertia of the sample, and
$T$ is the torque imparted to the sample by the magnetic field.
8. Apparatus for enabling the electrical resistivity of a sample to be determined, comprising;
   1. means for establishing a rotating magnetic field,
   2. means for supporting the sample in such a position relative to the lines of force of said magnetic field that the flux penetration of the sample by said magnetic field is a maximum,
   3. means for sensing the torque imparted to the sample in said position by said magnetic field, said means for supporting said sample comprises;
   4. an elongated rod having an upper and lower end,
   5. a platform removably attached to said lower end of the rod having a central opening therethrough, said platform lying in a plane parallel to said magnetic field and
   6. a sample holder with means thereon for positioning said holder in said opening and permitting universal movement of said sample holder relative to said platform.
9. The apparatus according to claim 8, further comprising;
   7. indicating means on one of said holder and said platform for referencing the angular position of one with respect to the other.
10. The apparatus according to claim 8, wherein;
   3. said rod is resiliently supported by a pair of springs biasing the same in opposite directions.
11. The apparatus according to claim 8, further comprising;
   7. a conductor on said rod spaced from said platform toward said upper end, and
   8. means for producing a second magnetic field for imparting a torque to said conductor.
12. The apparatus according to claim 8, wherein;
   7. said sample holder comprises a spherical shell having two complimentary mating halves.
13. Apparatus for enabling the electrical resistivity of a sample to be determined, comprising;
   1. a platform supported for rotation having a central opening,
   2. a sample holder with means thereon for positioning said holder in said opening and permitting universal movement of said sample holder relative to said platform,
   3. means for establishing a rotating magnetic field in a plane parallel to the plane of said platform to impart a torque to said holder, 4. a sample supported in said holder in such a position relative to the lines of force of said magnetic field that the flux penetration of said sample by said field is a maximum, and
5. indicating means on one of said platform and sample holder for indicating the angular position of said sample holder with respect to said platform.

14. apparatus according to claim 13, wherein;
6. said sample holder comprises a spherical shell having two complimentary mating halves.